(12) United States Patent
Iwano et al.

(10) Patent No.: US 6,334,757 B1
(45) Date of Patent: Jan. 1, 2002

(54) WATER TURBINE

(75) Inventors: Ryuichiro Iwano; Katsumasa Shinmei, both of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/417,711

(22) Filed: Oct. 13, 1999

(30) Foreign Application Priority Data

Oct. 14, 1998 (JP) .......................................... 10-291728

(51) Int. Cl.$^7$ .................................................. F03B 3/18
(52) U.S. Cl. ...................................... 415/161; 415/164
(58) Field of Search ................................ 415/148, 159, 415/160, 161, 163, 164, 165

(56) References Cited

U.S. PATENT DOCUMENTS 5,441,384 A * 8/1995 Gokhman ................... 415/161
6,007,297 A * 12/1999 Buchelt ...................... 415/161

FOREIGN PATENT DOCUMENTS

| JP | 51-72846 | 6/1976 |
| JP | 52-98841 | 8/1977 |
| JP | 59-82580 | 5/1984 |
| JP | 60-182361 | 9/1985 |
| JP | 61-43977 | 3/1986 |

\* cited by examiner

*Primary Examiner*—Christopher Verdier
(74) *Attorney, Agent, or Firm*—Mattingly, Stanger & Malur, P.C.

(57) ABSTRACT

A water turbine comprises a runner, guide vanes formed of a plurality of vanes arranged outside the runner in a peripheral direction, each of the vanes being rotatable about a center axis thereof parallel with a rotation shaft of the runner, stay vanes formed of a plurality of vanes outside the guide vanes in a peripheral direction, and a casing covering the outside of the stay vanes, wherein sections of each vane of the guide vanes perpendicular to the center axis are displaced to the rotation direction of the runner from an upper side of the runner to a lower side, under the condition that the guide vanes are shutdown.

16 Claims, 13 Drawing Sheets

WATER TURBINE

BACKGROUND OF THE INVENTION

The present invention relates to a water turbine provided with guide vanes and, more particularly, to a water turbine with three-dimensional vane type guide vanes. A vane construction, in which an outer profile and/or position in section perpendicular to the rotational axis thereof, of each vane forming the guide vanes changes to a direction of a rotation axis thereof, is referred to as the three-dimensional vane type.

A conventional water turbine will be explained hereunder, referring to FIGS. 20(a) and 20(b). FIG. 20(a) is a horizontal sectional view of the conventional water turbine and FIG. 20(b) is a sectional view taken along a line A—A of FIG. 20(a). The water turbine is formed of a casing 1, stay vanes 2, guide vanes 3, a runner 4, etc. Water enters the casing 1 and then flows in the runner through the stay vanes 2 and the guide vanes 3. The water flowed in the runner 4 rotates the runner 4 in a rotation direction 11. Upper and lower sides of the runner 4 are fixed to a band 8 and a crown 10, respectively. The crown 10 is fixed to a rotating shaft 14 and the runner 4 rotates about the center of the rotating shaft 14. Each vane of the guide vanes 3 rotates about the center of a rotating shaft 7.

All vanes of the guide vanes 3 are opened and closed at the same phase. The opening and closing of the vanes are effected by rotation of a guide ring 24 connected to the rotating shaft 7 by arms 25a, 25b. For the guides vanes 3, it is necessary to fully shutdown water when the operation is stopped. Therefore, usually, each vane of the guide vanes 3 has a shape of two-dimensional vane type. A vane construction in which the outer profile and position in each section perpendicular to the rotating shaft 7 each are the same as those in the other sections is referred to as the two-dimensional vane type.

One of subjects which are important to the performance of a water turbine is to prevent cavitation. Occurrence of cavitation inside the runner 4 causes problems such as reduction in efficiency, occurrence of vibration or noises, etc. In the case where cavitation is remarkable, the runner 4 is damaged and its exchange may be required in some cases. In the case of the water turbine in FIGS. 20(a), 20(b), since the curvature of the runner 4 on the side of the band 8 is large, the flow in this region is accelerated, whereby the pressure is lowered. Therefore, it is important to prevent cavitation from occurring at the inlet of the runner 4 on the side of the band 8.

As a first prior art concerning prevention of cavitation, there is JP A 59-82580 which discloses a construction in which a leading edge portion 9 of the runner 4 is inclined against a rotation direction 11 from the crown 10 side to the band 8 side.

As a second prior art concerning prevention of cavitation, there are JP A 51-72846, JP A 52-98841 and JP A 61-43977, each of which discloses three-dimensional vane type guide vanes each having a side shape of a parallelogram or a trapezoid. A construction in which a trailing edge of a sectional shape of an upper side of the guide vane 4 extends toward the runner 4 also is disclosed.

As a third prior art concerning prevention of cavitation, there is JP A 60-182361 which discloses a guide vane constructed so that an angle between a peripheral direction of the runner and a straight line connecting a rotation axis of the guide vane and a trailing edge becomes smaller on a lower side.

SUMMARY OF THE INVENTION

In the case of the first prior art, cavitation on the suction surface side of blade of the runner 4 can be prevented when a water level of a dam is high, that is, in a high head. However, cavitation on a pressure surface side of blade of the runner 4 when the water level is low, that is, in a low head can not be prevented. Therefore, it is difficult to take countermeasures in the case where operation conditions change due to lowering in water level of the dam. Further, in order to prevent cavitation on an existing water turbine, it is necessary to exchange a runner 4 of a high manufacturing cost. Further, since the runner 4 is a large-sized structural component, much time is needed for conveying and installing the runner, which is a cause of rising in cost.

In the case of the second prior art, the guide vanes 3 can not shutdown a water flow path.

In the case of the third prior art, the design becomes difficult because it is necessary to change a vane shape of the guide vane from an upper side to a lower side.

An object of the present invention is to provide a water turbine which is provided with guide vanes each having a shape of three-dimensional vane type easy to design and is able to shutdown and which is able to prevent cavitation occurrence at a low cost.

First of all, a cause that cavitation occurs at the inlet of a runner will be explained, referring to FIG. 21. Cu, Cv and Cw in FIG. 21 denote a rotating speed of the runner, an absolute speed of water flow and a relative water flow speed to the runner, respectively. A triangle formed by those three speed vectors is called a speed triangle at the inlet of the runner. FIGS. 21(a), (b) and (c) show speed triangles at time of low head, at time of rated operation head and at time of high head, respectively.

As shown in FIG. 21, at time of any heads other than (b) of rated speed operation head, an angle of water flowing in the runner does not meet an angle of a leading edge (tip portion) of blade of the runner 4. Therefore, there is the possibility that cavitation occurs. At time of low head in FIG. 21(a), cavitation is likely to occur on the pressure surface side 13 of blade of the runner 4. At time of high head in FIG. 21(c), cavitation is likely to occur on suction surface side 12 of blade of the runner. Such a change in angle of water flowing in the runner is known to occur generally in water turbines.

Usually, the possibility of cavitation occurrence is larger at time of high head in which a load to the runner becomes larger. However, there is also some possibility of cavitation occurrence at a time of a low head, according to design. In general, it is required for cavitation not to occur within a range of operation head of the water turbine. Therefore, for design of runner, it is required to prevent cavitation from occurring at a head at which the cavitation is most likely to occur.

By the way, an inflow angle of water to the runner is an average inflow angle in a peripheral direction of the runner. Precisely, in the vicinity of blade of the runner and at the other place, the inflow angle changes in the peripheral direction. The reason will be explained, referring to FIG. 22. Generally, as blades generating lift, wings of an air plane, runner blades of a water turbine, etc. are known. At tips of those blades or wings, as shown in FIG. 22, a direction of fluid flow changes so that the fluid flows in from the pressure surface side. This is because a kind of eddy layer called circulation is formed around the blade, and the direction of flow is bent, receiving induction speed from the eddy layer.

In this manner, in the case where a blade generating lift is inside the flow, the inflow angle of fluid changes, with an upstream side being influenced by the blade. In the case of runner of a water turbine, also, as shown in FIG. 23, there is a tendency that water is flowed in from the pressure surface side 13 in the vicinity of the leading edge (tip end) 4a of blade of the runner 4. From the above-mentioned matters, also, it is found that cavitation is likely to occur on the suction surface side 12 of blade of the runner at time of high head. As shown in the same figure, a water flow at a place separate from the leading edge 4a of blade of the runner 4 is almost an average relative speed Cw.

An object of the present invention is to control a magnitude of the effect which blades of a water turbine runner generating lift impart to an upstream side thereof, based on the above-mentioned analysis result. This control changes a local inflow angle around the leading edge of blade of the runner and prevents occurrence of cavitation.

Concretely, in the case where the possibility of occurrence of cavitation is large on the side of band 8 when the head is low, a guide vane has a profile such that a distance between the runner becomes far (large) on the side of lower cover when the guide vanes are opened. By forming the guide vane in such a profile, an influence of the above-mentioned runner blade (blade generating lift) reaches to a more upstream side. As a result, the direction of a flow directed so as to be flowed in from the suction surface side 12 is bent to the pressure surface side 13 as shown in FIG. 21(a), whereby the inflow angle is caused to meet an angle of the leading edge 4a.

In the case where the possibility of occurrence of cavitation is large on the side of the band 8 at time of high head, the guide vanes each are formed in such a profile that a distance between the runner becomes closer at the lower cover side when the guide vanes are opened. By making the guide vanes in such a profile, the above-mentioned influence of the runner blade (blade generating lift) does not reach to the upstream side. As a result, the flow is bent as shown in FIG. 23 and inflow from the side of the pressure surface 13 is prevented, whereby the inflow angle can be met with an angle of the leading edge 4a of the runner blade.

From the above consideration, a first invention to achieve the above-mentioned object resides in a water turbine which comprises a runner, guide vanes formed of a plurality of vanes arranged outside the runner in a peripheral direction, each of the vanes being rotatable about a center axis thereof parallel with a rotation shaft of the runner, stay vanes formed of a plurality of vanes outside the guide vanes in a peripheral direction, and a casing covering the outside of the stay vanes, wherein sections of each vane of the guide vanes perpendicular to the center axis are displaced to at least one direction of the peripheral direction and radial direction of the runner from one side to the other side in the center axis, under the condition that the guide vanes are shutdown, and respective profiles of the sections displaced are similar to each other and the size of each the section is set according to distance from the rotating shaft of the runner.

A second invention resides in a water turbine which comprises a runner, guide vanes formed of a plurality of vanes arranged outside the runner in a peripheral direction, each of the vanes being rotatable about a center axis thereof parallel with a rotation shaft of the runner, stay vanes formed of a plurality of vanes outside the guide vanes in a peripheral direction, and a casing covering the outside of the stay vanes, wherein sections of each vane of the guide vanes perpendicular to the center axis are displaced to the peripheral direction of the runner from one side to the other side in the center axis, under the condition that the guide vanes are shutdown.

A third embodiment is a water turbine which comprises a runner, guide vanes formed of a plurality of vanes arranged outside the runner in a peripheral direction, each of the vanes being rotatable about a center axis thereof parallel with a rotation shaft of the runner, stay vanes formed of a plurality of vanes outside the guide vanes in a peripheral direction, and a casing covering the outside of the stay vanes, wherein sections of each vane of the guide vanes perpendicular to the center axis are displaced to a radial direction of the runner from one side to the other side in the center axis, under the condition that the guide vanes are shutdown, and respective profiles of the sections displaced are similar to each other and the sections are formed so as to be smaller in size as distance from the rotating shaft of the runner becomes smaller.

A fourth invention resides in a water turbine which comprises a runner, guide vanes formed of a plurality of vanes arranged outside the runner in a peripheral direction, each of the vanes being rotatable about a center axis thereof parallel with a rotation shaft of the runner, stay vanes formed of a plurality of vanes outside the guide vanes in a peripheral direction, and a casing covering the outside of the stay vanes, wherein sections of each vane of the guide vanes perpendicular to the center axis are displaced to both a peripheral direction and a radial direction of the runner from one side to the other side in the center axis, under the condition that the guide vanes are shutdown, and respective profiles of the sections displaced are similar to each other and the sections are formed so as to be smaller in size as distance from the rotating shaft of the runner becomes smaller.

A fifth embodiment resides in a water turbine which comprises a runner, three-dimensional vane type guide vanes arranged outside the runner, stay vanes arranged outside the runner, and a casing covering the outside of the stay vanes, wherein each vane forming the guide vanes is formed so that a profile of the each vane, viewed from a radial direction of the runner is generally a parallelogram under the condition that the guide vanes are closed, and when the each vane is viewed from a center axis of rotation thereof, sections thereof perpendicular to the center axis appear deviated to a peripheral direction of the runner.

A sixth invention resides in a water turbine which comprises a runner, three-dimensional vane type guide vanes arranged outside the runner, stay vanes arranged outside the runner, and a casing covering the outside of the stay vanes, wherein each vane forming the guide vanes is formed so that a profile of the each vane, viewed from a radial direction of the runner is generally trapezoidal under the condition that the guide vanes are shutdown and when the each vane is viewed from the center axis of rotation thereof, sections thereof perpendicular to the center axis appear deviated to a radial direction of the runner.

According to the above-mentioned invention, under the condition that the guide vanes are opened at time of operation of the water turbine (hereunder, simply referred to as an opening condition), since distance between the guide vanes and the runner can be set most suitable according to a head or position at which cavitation is most likely to occur, occurrence of cavitation can be effectively prevented.

For example, in the case where cavitation is most likely to occur on the band side at time of high head, each vane of the guide vanes is formed so that sections of each vane of the guide vanes, perpendicular to a center axis of the each vane (hereunder, simply, referred to as sections of vane) are displaced to a rotation direction (peripheral direction) of the runner from the upper cover side to the lower cover under the condition that the guide vanes are shutdown (hereunder, simply, referred to as shutdown condition). Alternatively, the guide vanes can be formed so that under the shutdown condition of the guide vanes, sections of each vane of the guide vanes are displaced to a radially inner side of the runner from the upper cover side to the lower cover side.

By being provided with this construction, when the guide vanes are opened, distance between each vane of the guide vanes and each blade of the runner becomes small. As a result, since an influence of the blades of the runner does not reach to an upstream side as mentioned above, occurrence of cavitation can be effectively prevented.

In the case where cavitation is most likely to occur on the band side at time of low head, each vane of the guide vanes is formed so that under the shutdown condition of the guide vanes, sections of the each vane are displaced to an opposite direction (peripheral direction) to the rotation direction of the runner from the upper cover side to the lower cover side. Alternatively, the each vane of the guide vanes can be formed so that under the shutdown condition of the guide vanes, sections of each vane are displaced to a radially outer side of the runner from the upper cover to the lower cover.

By being provided with the present construction, when the guide vanes are opened, distance between the each vane of the guide vanes and each blade of the runner becomes larger on the lower cover side. As a result, an influence of the blades of the runner reaches to an upstream side as mentioned above, occurrence of cavitation can be effectively prevented.

In any above cases, respective profiles of sections which are displaced are sufficient if they are formed to be similar to each other and become small in size as the distance from the rotating shaft of the runner becomes small. In the case where the sections of vane are displaced to the peripheral direction of the runner, since the distance between each of the vane sections and the rotating shaft of the runner is the same, a similarity ratio is 1.

By forming the sections of each vane of the guide vanes in such sections, when the guide vanes are closed, a leading edge and trailing edge of adjacent vanes become in contact with each other. Therefore, shutdown performance of the guide vanes can be sufficiently secured.

Further, in any above-mentioned cases, vane sections are only displaced to the peripheral direction or radial direction of the runner while the similarity of profiles of the vane sections are being maintained. Therefore, if a vane profile of one section is designed, the other section can be obtained only by shifting the vane profile to the peripheral direction or radial direction while maintaining the similarity. That is, since it is unnecessary to redesign vane type itself in each section, the design becomes easy.

Further, according to the above-mentioned each invention, prevention of cavitation of an existing water turbine can be achieved by exchanging guide vanes. That is, since it is unnecessary to exchange a runner which is high in cost, cavitation can be prevented at a low cost.

BRIEF DESCRIPTION OF THE DRAWING

FIG. 20(a) is a cross-sectional view and FIG. 20(b) is a sectional view viewed from A—A of FIG. 20(a);

DESCRIPTION OF EMBODIMENTS OF THE INVENTION

Figure 1:
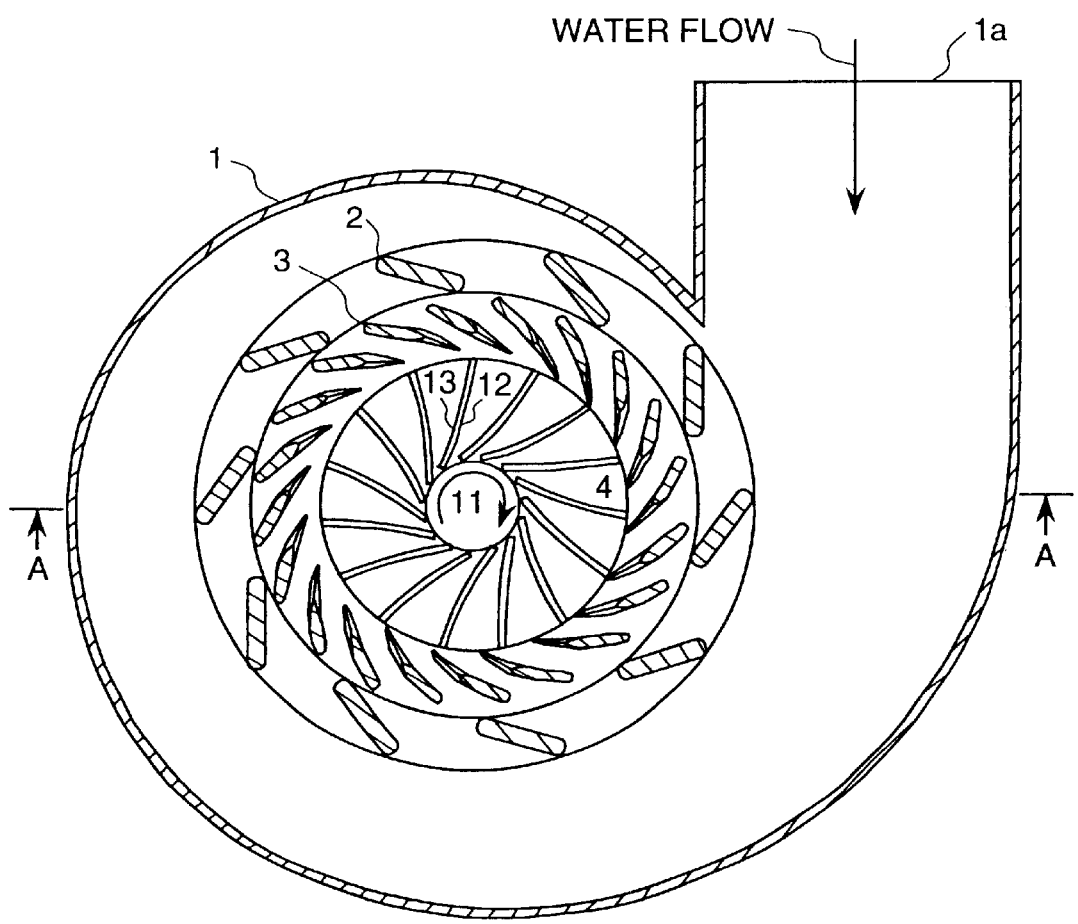
FIG. 1 is a cross-sectional view of a water turbine of a first embodiment of the present invention.

Embodiments of the present invention will be described hereunder, referring to the drawings.

EMBODIMENT 1

Figure 2:
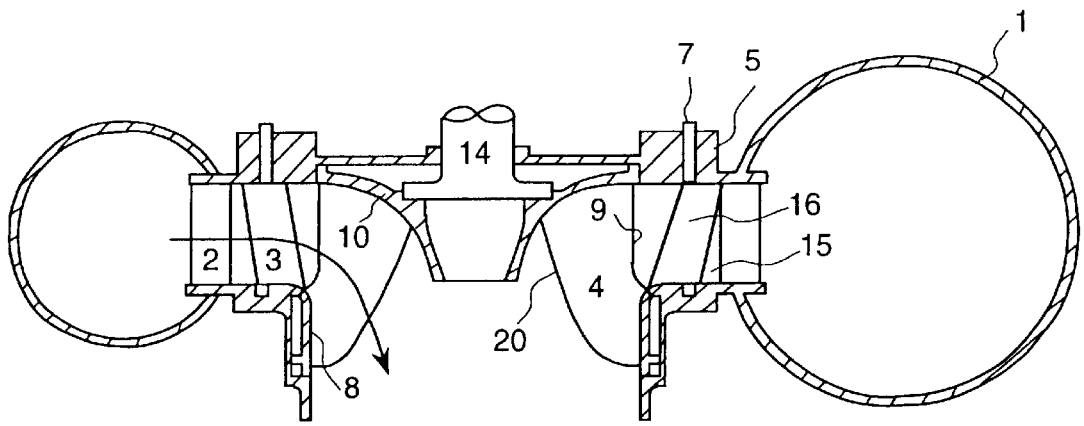
FIG. 2 is a sectional view taken along a line A—A of FIG. 1.
Figure 3:
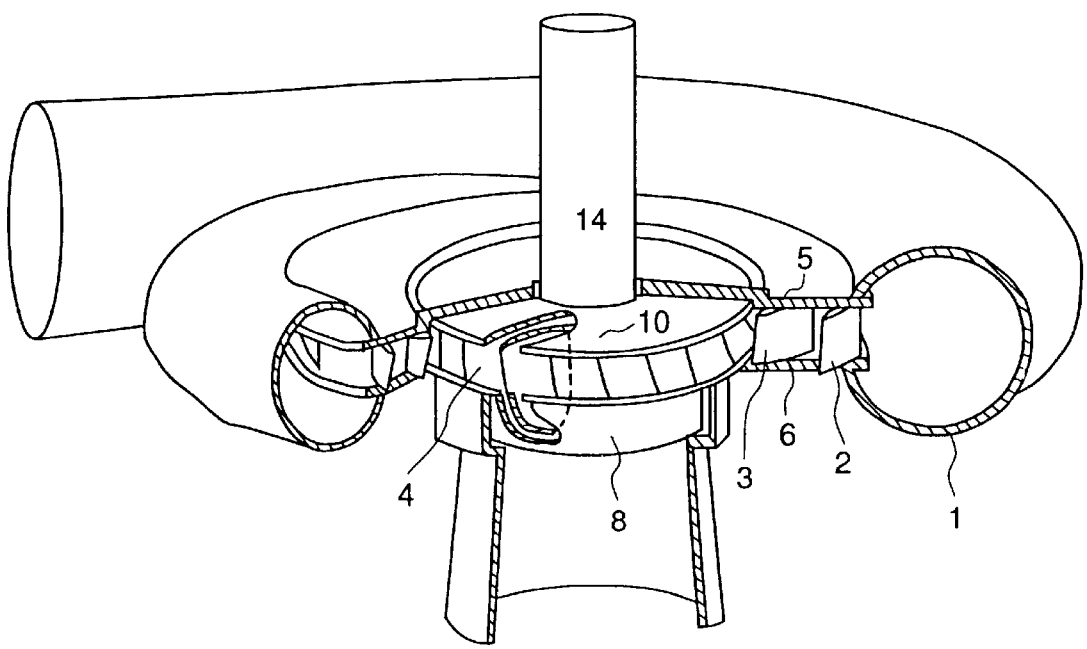
FIG. 3 is a perspective view of the water turbine of the first embodiment of the present invention.

A first embodiment of a water turbine according to the present invention will be described, referring to FIGS. 1 to 3. FIG. 3 is a perspective view of the water turbine of the first embodiment. FIG. 1 is a cross-sectional view of the water turbine of the first embodiment. The feature shows the condition that guide vanes 3 are opened at a some opening angle (or opening degree). FIG. 2 is a sectional view taken along A—A of FIG. 1.

The water turbine is constructed of a casing 1, stay vanes 2, guide vanes 3, a runner 4, etc. Lower and Upper sides of the runner 4 are fixed to a band 8 and a crown 10, respectively. The crown 10 is fixed to a rotating shaft 14, the runner 4 rotates about the center of the rotating shaft 14. Each vane of the guide vanes 3 rotates about the center of a rotating shaft 7.

As shown in FIGS. 1 and 2, vanes of each of the stay vanes 2 and guide vanes 3 are arranged equi-distant in a peripheral direction about a center axis of the rotating shaft 14. All the vanes of the stay vanes are the same as each other in profile and opening angle (opening degree) and fixed to an outlet side and inner peripheral side of the casing 1.

All the vanes of the guide vanes 3 are the same as each other in profile are sandwiched between the upper cover 5 and lower cover 6 forming an outlet flow path of the casing 1. Each vane is formed so as to be rotatable about the center of the rotating shaft 7. A flow rate of water passing through the guide vanes 3 can be adjusted by adjusting an opening angle (or opening degree) of the vanes. opening and closing of the vanes are effected by rotating a guide ring (not shown) connected to the rotating shafts 7 by arms. The guide ring is driven to rotate by a hydraulic motor or electric motor. In this manner, all the vanes of the guide vanes 3 are formed so as to be able to open and close at the same phase (at the same opening angle).

Water led from the dam enters the casing 1, and flows in the runner 4 through the stay vanes 2 and the guide vanes 3. That is, in FIG. 1, the water entered the casing 1 at a casing inlet 1a flows inside the casing 1 in the peripheral direction (in the right turning direction in FIG. 1) and flows into the stay vanes 2 from an outlet positioned at the inner peripheral side of the casing 1. The water flowed in the runner 4 rotates the runner 4 in a rotation direction 11, whereby a generator (not shown) connected to the rotating shaft 14 is rotated. In this manner, potential energy of the water stored in the dam is converted into electric power.

Figure 4:
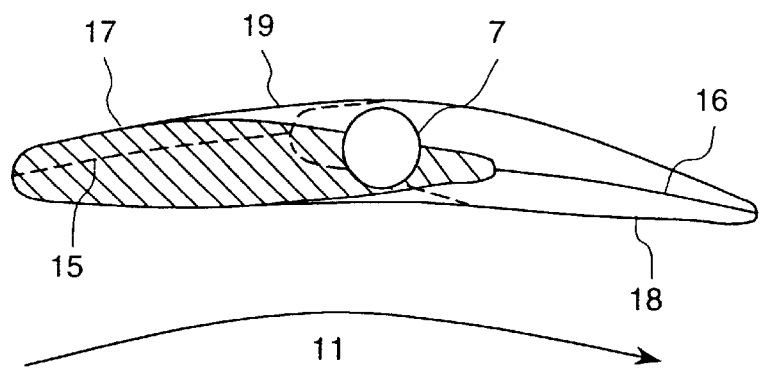
FIG. 4 is a perspective view of a vane of guide vanes, viewed from an upper cover side under the condition that the guide vanes of the first embodiment are closed.
Figure 5:
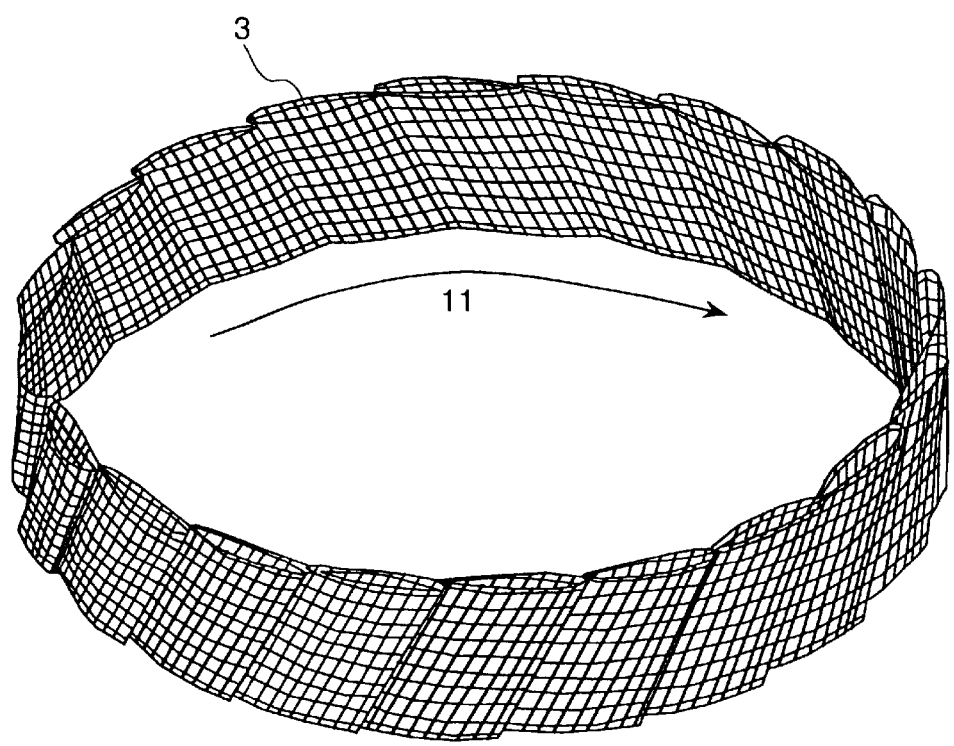
FIG. 5 is a perspective view of the guide vanes of the first embodiment under the condition that they are closed.
Figure 6:
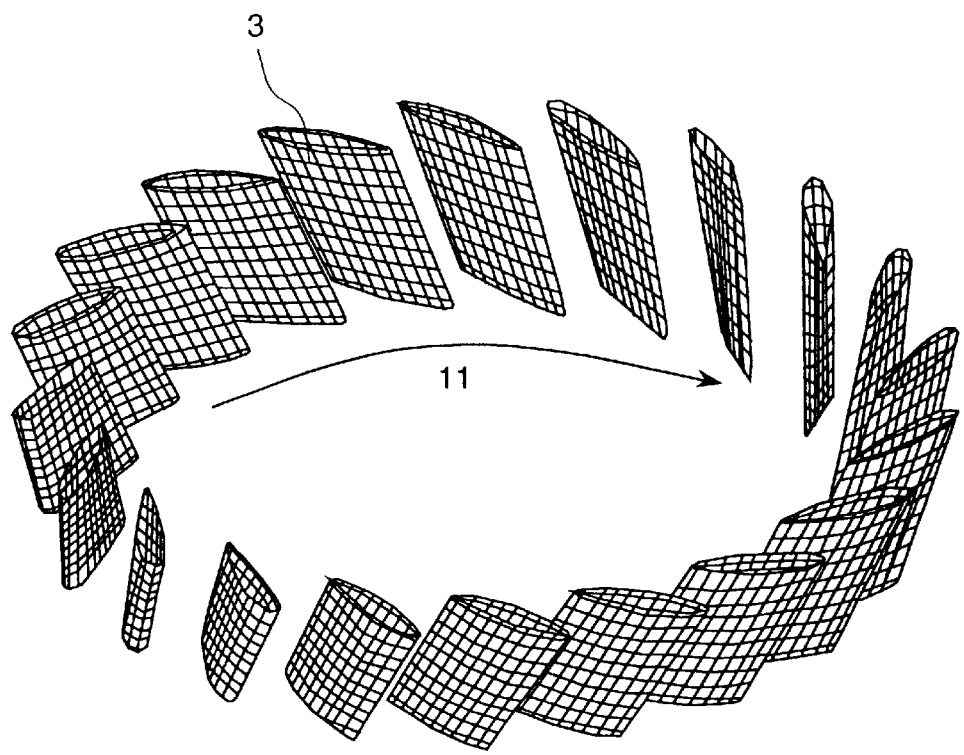
FIG. 6 is a perspective view of the guide vanes of the first embodiment under the condition that the guide vanes are opened.

Next, referring to FIGS. 4 to 6, a detailed construction of the guide vanes 3 of the present embodiment will be explained. FIG. 4 is a view of one vane of the guide vanes 3, viewed from a side of the upper cover 5 under the condition of the guide vanes 3 being closed. FIG. 5 is a perspective view of the condition of the guide vanes 3 being closed. FIG. 6 is a perspective view of the condition of the guide vanes 3 being opened. In FIGS. 5 and 6, the upper side corresponds to the upper cover (5) side.

As shown in FIGS. 4 and 5, each vane of the guide vanes 3 has a construction that sections thereof are displaced to a rotation direction (peripheral direction) 11 of the runner 4 from the side of the upper cover 5 (hereunder, referred to as the upper side) toward the side of the lower cover 6 (hereunder, referred to as the lower side). That is, sections perpendicular to the rotating shaft 7 of vane of the guide vanes 3 are continuously displaced at a fixed rate to the rotation direction 11 of the runner 4 from the upper side toward the lower side. The direction of the rotating shaft 7 is the same as the direction of the rotating shaft 14 of the runner 4.

In this case, the profiles (outer shapes) of the sections of the vane do not change but the position changes. In other words, profiles of respective sections of the vane displaced in the rotation direction 11 are similar to each other, and a similarity ratio is 1. The vane has the following two appearance features. The first feature is that the profile of the vane viewed from the radial direction of the runner 4 is generally parallelogram. The second feature is that when the vane is viewed from the rotating shaft 7, the section perpendicular to the rotating shaft 7 appears to deviate to the rotation direction of the runner 4. In this manner, the three-dimensional vane type guide vanes 3 are formed. As shown in FIG. 4, the sectional shape 18 on the lower side of the guide vane 3 is one that a sectional shape 17 on the upper side is moved through rotation in the rotation direction 11, and it is not simply transferred in parallel. In this case, a projection line (hereunder, simply referred to as a projection line) formed by projecting a line formed by connecting the corresponding points on respective sections of the vane from the upper side to the lower side on one plane perpendicular to the center axis of the runner 4 becomes an arc of which the center is the rotating shaft 14 of the runner 4. For example, a projection line of a line formed by connecting points of the leading edges 15 (or trailing edges 16) in respective sections from the upper side to the lower side becomes an arc the center of which is the center of the rotating shaft 14.

On the above, the features were explained under the condition of guide vanes being closed. By being provided with those features, the vanes become a condition that the leading edges 15 and trailing edges 16 of adjacent vanes are in contact with each other when the guide vanes 3 are closed. Therefore, as shown in FIG. 5, sufficient shutdown performance can be maintained. In this manner, in the present embodiment, three-dimensional vane type guide vanes which are able to shutdown can be constructed.

Figure 7:
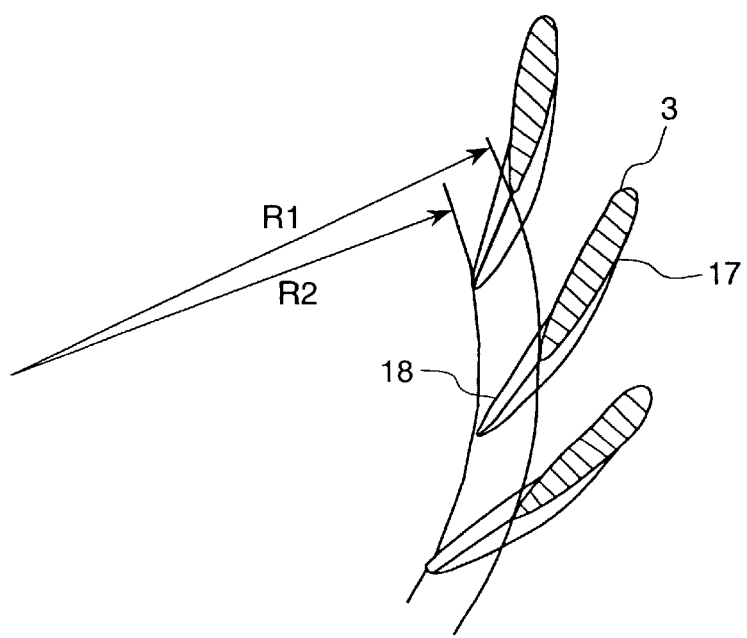
FIG. 7 is a perspective view of adjacent three vanes viewed from the upper cover side, under the condition the guide vanes of the first embodiment are opened.

As is understood from FIGS. 4 to 6, under the condition of the guide vanes 3 being opened at time of operation of the water turbine, distances between the guide vanes 3 and the inlet of the runner 4 differ between the side of the upper cover 5 (the upper side) and the side of the lower cover 6 (the lower side). The details are explained, referring to FIG. 7. FIG. 7 is a perspective view of three adjacent vanes, viewed from the side of the upper cover 5 under the condition that the guide vanes of the first embodiment are opened. As shown in FIG. 7, the radial directional position (distance from the center of the runner 4) R1 of the leading edge of the sectional shape 17 on the upper side is larger than the radial directional position R2 of the trailing edge of the sectional shape 18 on the lower side.

In this manner, since the guide vanes 3 are closer to the runner 4 on the lower side, an effect of eddy layer which the runner 4 has does not reach the upstream side as mentioned above. As a result, an inflow angle of the leading edge on the side of band 8 of the vane of the runner 4 is an angle at which water flows in from the side closer to the suction surface side than conventional one. Thereby, pressure on the suction surface side rises, so that it is effective to prevent cavitation which is likely to occur at the side of the band of the inlet of the runner at time of high head.

Figure 8:
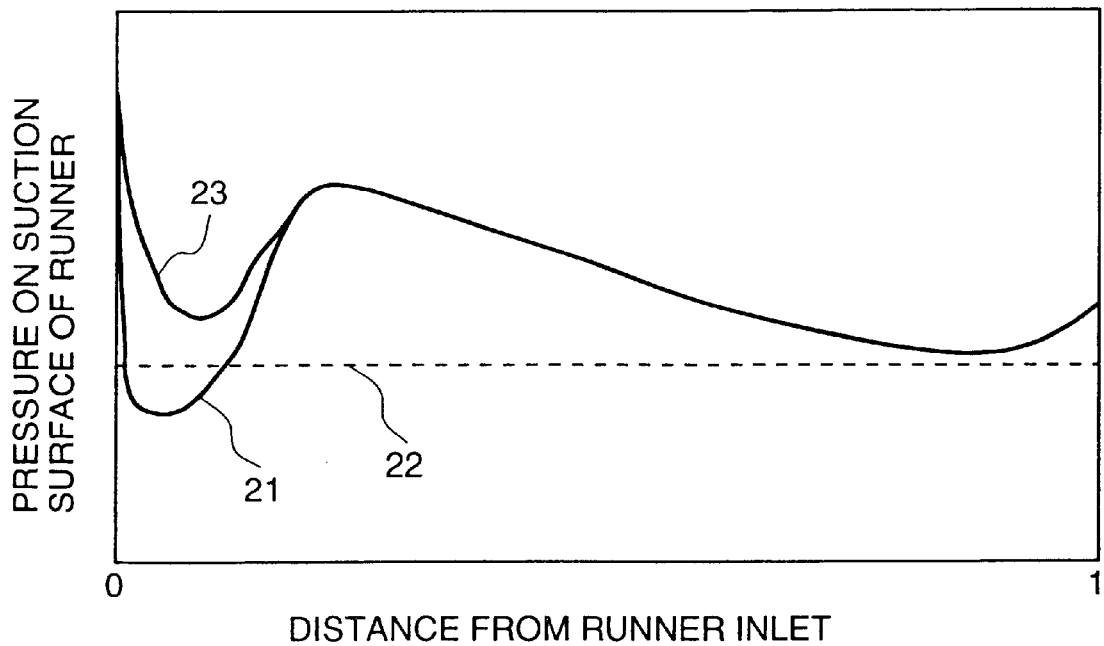
FIG. 8 is a graph of an example of a cavitation prevention effect analytically obtained on the first embodiment.

Referring to FIG. 8, the result that the above effect of the present embodiment is analytically obtained will be explained. FIG. 8 shows an example of analysis of pressure distribution on the suction surface on the side of the band 8 of the runner 4. The abscissa is distance that the distance from the inlet of the runner 4 is normalized by the distance from the leading edge 9 of the runner 4 to the trailing edge 20. In this figure, a solid line 23 denotes the present embodiment and a solid line 21 denotes a conventional two-dimensional vane type.

As shown in FIG. 8, in the case of the conventional two-dimensional vane type, the pressure on the suction surface is lower in the vicinity of the inlet of the runner than a cavitation occurrence limit pressure 22, and cavitation occurs. On the other hand, in the case of the present embodiment, it is noted that the pressure on the suction surface becomes higher than the limit pressure 22 by the above-mentioned effect and it is possible to prevent occurrence of cavitation.

As mentioned above, according to the present embodiment, it is possible to effectively prevent cavitation from occurring on the suction surface of the runner 4 at time of high head, and it is possible to obtain a water turbine with the three-dimensional vane type guide vanes which are able to shutdown.

EMBODIMENT 2

Next, referring to FIGS. 9 to 11, a water turbine of a second embodiment of the present invention will be described hereunder.

Figure 9:
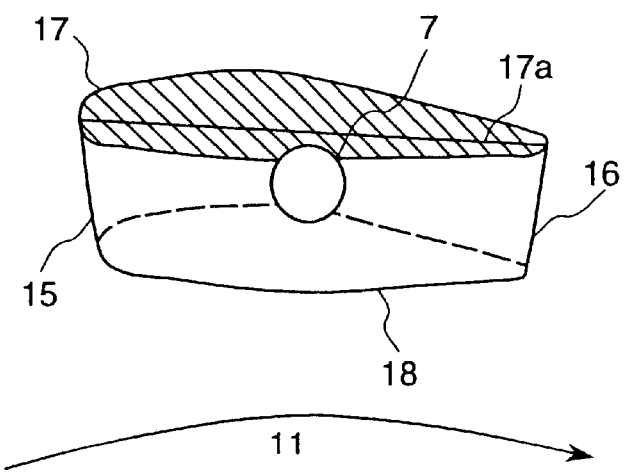
FIG. 9 is a perspective view of a vane of guide vanes, viewed from an upper cover under the condition that the guide vanes of a second embodiment are closed.

FIG. 9 is a view of a vane of guide vanes, viewed from the upper cover side under the condition of the guide vanes being closed. FIG. 10 is a perspective view of the guide vanes 3 which are closed. FIG. 11 is a perspective view of adjacent three vanes, viewed from the upper cover side under the condition of the guide vanes 3 being opened. The other constructions than the guide vanes 3 are the same as the first embodiment, so that the explanation thereof is omitted.

Figure 10:
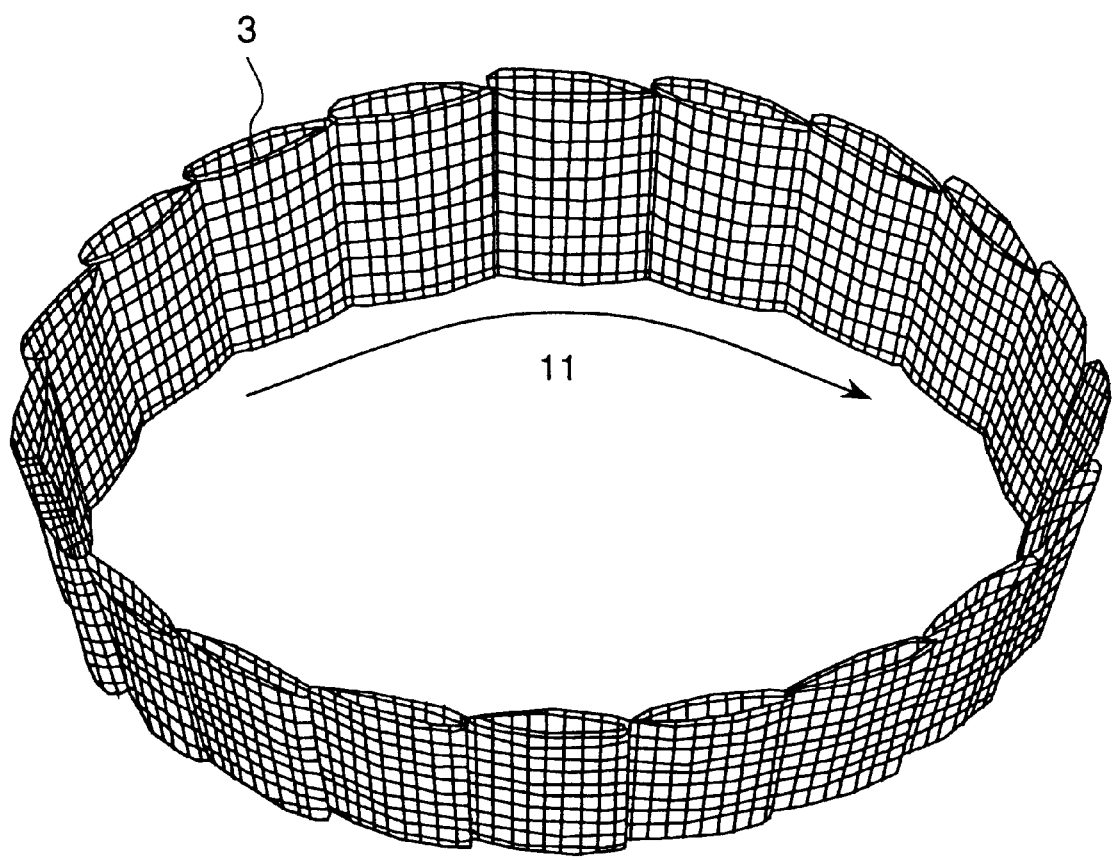
FIG. 10 is a perspective view of the guide vanes of the second embodiment under the condition that they are closed.

As shown in FIGS. 9 and 10, sections of each vane of the guide vanes 3 of the present embodiment each are displaced to the side of the rotating shaft 14 (the central axis side) of the runner 4 on the side of the lower cover 6 (the lower side) than on the side of the upper cover 5 (the upper side). That is, sections of the vane perpendicular to the rotating shaft 7 are continuously displaced to the inner side in the radial direction of the runner 4 at a fixed rate from the upper side to the lower side.

In this case, the sectional shapes of the vane become smaller from the upper side to the lower side, and similar to each other. That is, the chord length and periphery length of the sections of the vane are proportional to distance from the center of the runner 4. The chord length means length of a chord (straight line) connecting a leading edge and a trailing edge in a vane section. As an example, a chord 17a in a sectional shape 17 is shown in FIG. 9. The cross-sectional area of the vane is an area proportional to second power of a distance from the center of the runner 4.

The vane has the following two appearance features. The first feature is that a profile of vane viewed from a radial direction of the runner 4 is generally trapezoidal. The second feature is that when the vane is viewed from the direction of the rotating shaft 7, the sections perpendicular to the rotating shaft 7 appear to deviate to the radially inner side of the runner 4. In this manner, the three-dimensional vane type guide vanes 3 is constructed.

As shown in FIG. 9, a sectional shape 18 on the lower side of vane of the runner 3 is reduced similarly to the sectional shape on the upper side and moved toward the center of the runner 4, but it is not simply moved in parallel. In this case, a projection line, which is formed by projecting, on a plane perpendicular to the central axis of the runner 4, a line connecting the corresponding points in respective sections of the vane from the upper side to the lower side, is a part of a straight line extending radially from the central axis. For example, the projection line of the line connecting points of the leading edge 15 (or trailing edge 16) of a vane in respective sections from the upper side to the lower side is a part of a straight line extending radially to the central axis.

By being provided with such features, the leading edge 15 and the trailing edge 16 of adjacent vanes become in a condition that they are in contact with each other when the guide vanes 3 are closed. Therefore, as shown in FIG. 10, sufficient shutdown performance can be maintained. In this manner, in the present embodiment, three-dimensional vane type guide vanes which are able to be shutdown can be constructed.

Figure 11:
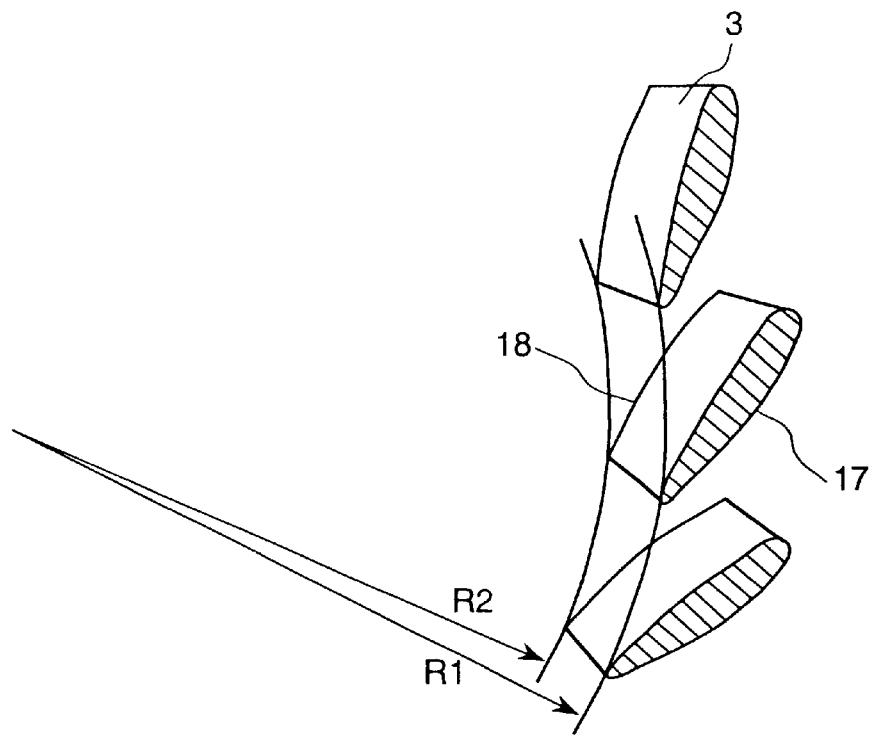
FIG. 11 is a perspective view of adjacent three vanes viewed from the upper cover side, under the condition the guide vanes of the second embodiment are opened.

Further, as shown in FIG. 11, under the condition of the guide vanes 3 being opened when the water turbine is operated, radial position R1(distance from the center of the runner 4) of the trailing edge of the sectional shape 17 on the upper side is larger than radial position R2 of the trailing edge of the sectional shape 18 on the lower side. Therefore, in the present embodiment, also, a similar effect to one in the first embodiment can be obtained. That is, cavitation which is likely to occur at the inlet of the runner on the band side at time of high head can be prevented. This effect is confirmed also by inventors' analysis.

As mentioned above, according to the present embodiment, cavitation occurring on the suction surface side of the runner 4 at time of high head can be effectively prevented, and a water turbine can be obtained, which turbine is provided with three-dimensional vane type guide vanes which is able to shutdown.

Further, in the first and second embodiments, a rate of displacement of vane sectional shapes of the guide vanes is fixed, however, it is sufficient even if the rate is not constant.

EMBODIMENT 3

Figure 12:
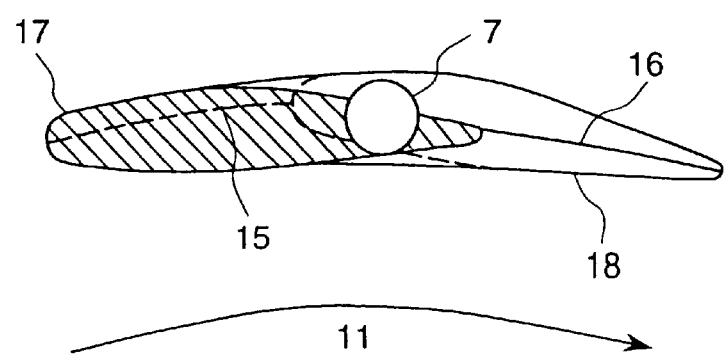
FIG. 12 is a perspective view of a vane of guide vanes, viewed from an upper cover under the condition that the guide vanes of a third embodiment are closed.
Figure 13:
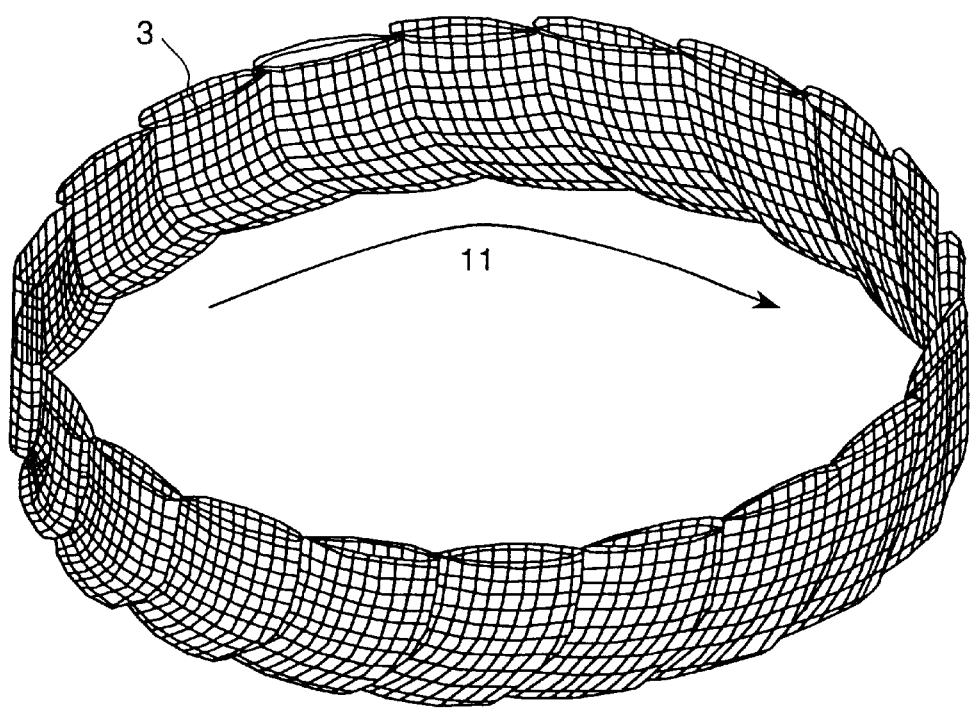
FIG. 13 is a perspective view of the guide vanes of the third embodiment under the condition that the guide vanes are closed.

Next, referring to FIGS. 12 and 13, a water turbine of a third embodiment of the present invention will be described hereunder. FIG. 12 is a view of one vane of guide vanes, viewed from the upper cover side under the condition of the guide vanes being closed. FIG. 13 is a perspective view showing the condition that the guide vanes 3 are closed. The construction other than the guide vanes is the same as the first embodiment, so that explanation thereof is omitted here.

In this embodiment, also, a displacement direction of sections of vane of the guide vanes 3 is the same as the first embodiment. That is, sections perpendicular to the rotating shaft 7 of the vane are continuously displaced to the rotation direction 11 of the runner 4 from the upper cover (5) side (the upper side) to the lower cover (6) side (the lower side).

A different point between the present embodiment and the first embodiment is in displacement rate of sections of vane. In the case of the present embodiment, the displacement rate of vane sections becomes larger from the upper side to the lower side. As a result, as shown in FIG. 13, the lower side of the vane has such a shape that the lower side projects toward the rotation direction 11. In this case, also, the profile of the sectional shape of the vane does not change but the position changes. In other words, profiles of respective sections of each vane displace to the rotation direction 11 are similar to each other and the similarity ratio is 1.

In this embodiment, also, a similar effect to the first embodiment can be obtained. Further, in the case of this embodiment, an effect by the three-dimensional vane type guide vanes 3 can be limited mainly to the lower side. Therefore, the condition of water flowing into the other portions than the runner 4 while preventing cavitation on the band (8) side of the runner 4 is not much influenced thereby. Therefore, it is particularly effective for exchanging only guide vanes 3 of an existing water turbine.

Further, the concept of the third embodiment can be applied to the second embodiment. That is, in the second embodiment, the displace rate of sections of vane of the guide vanes 3 can be larger from the upper side to the lower side. Further, the concept of the displacement rate of the vane sections is not limited to this concept. That is, the displacement rate can be changed arbitrarily between the upper side and lower side of the guide vanes 3.

EMBODIMENT 4

Figure 14:
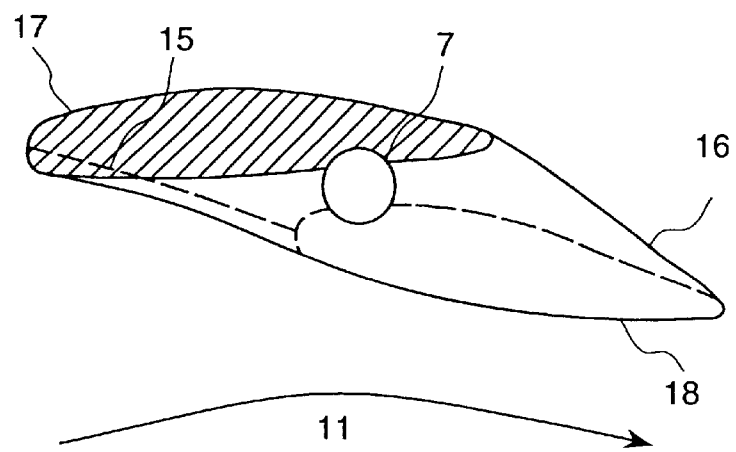
FIG. 14 is a perspective view of a vane of guide vanes, viewed from an upper cover under the condition that the guide vanes of a fourth embodiment are closed.
Figure 15:
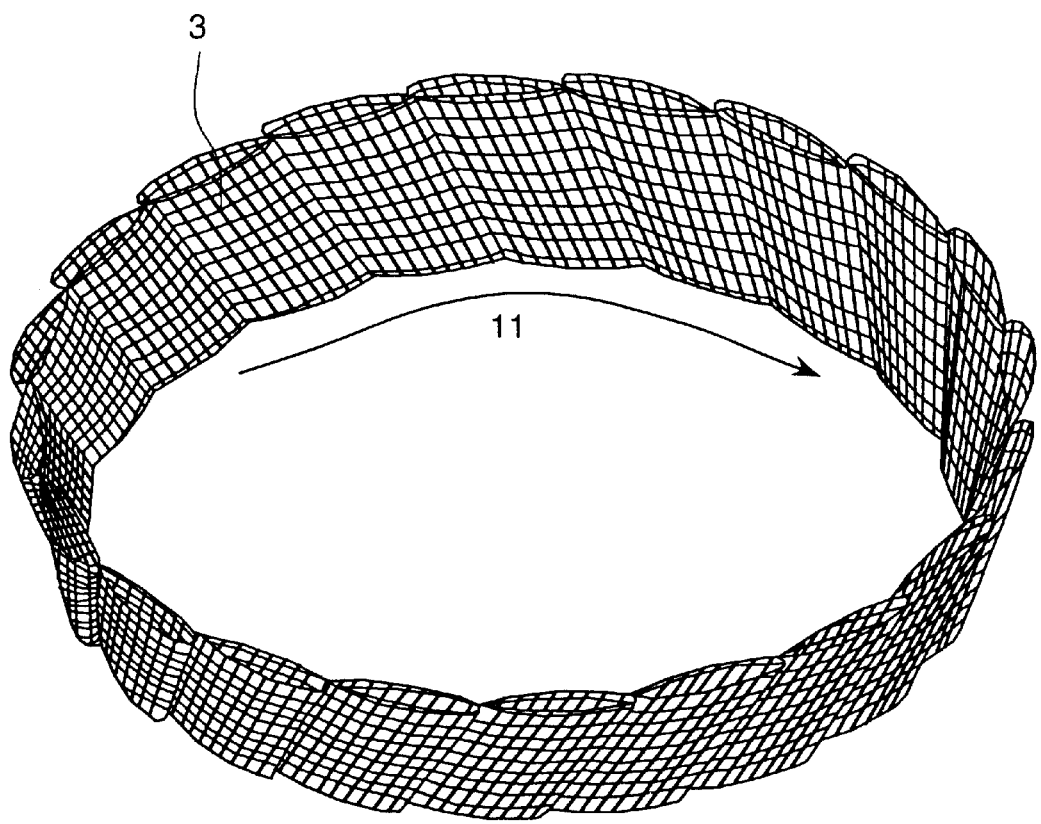
FIG. 15 is a perspective view of the guide vanes of the fourth embodiment under the condition that the guide vanes are closed.

A water turbine of a fourth embodiment of the present invention will be described hereunder, referring to FIGS. 14 and 15. FIG. 14 is a view of one vane of guide vanes, viewed from the upper cover side under the condition that the guide vanes of the forth embodiment are closed. FIG. 15 is a perspective view showing the condition of the guide vanes 3 being closed. The construction other than the guide vanes 3 is the same as the first embodiment, so that explanation thereof is omitted here.

The present embodiment is a combination of the first embodiment and the second embodiment. That is, sections of each vane of the guide vanes 3 perpendicular to the rotating shaft 7 are continuously displaced to the rotation direction (peripheral direction) of the runner 4 at a fixed rate. Further, the sections of vane perpendicular to the rotating shaft 7 are continuously displaced also to the radially inner side of the runner 4 at a fixed rate from the upper side to the lower side. In this case, the sectional shapes of the vane become small from the upper side to the lower side and they are similar to each other.

In the present embodiment, also, a similar effect to the first embodiment can be obtained, and the present embodiment is more effective by providing the feature of the second embodiment.

EMBODIMENT 5

Figure 16:
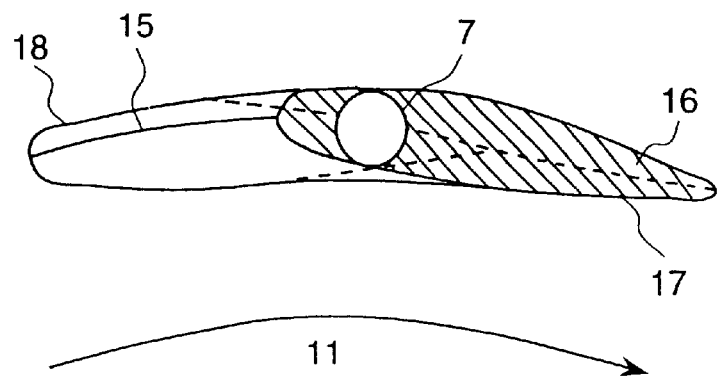
FIG. 16 is a perspective view of a vane of guide vanes, viewed from an upper cover under the condition that the guide vanes of a fifth embodiment are closed.
Figure 17:
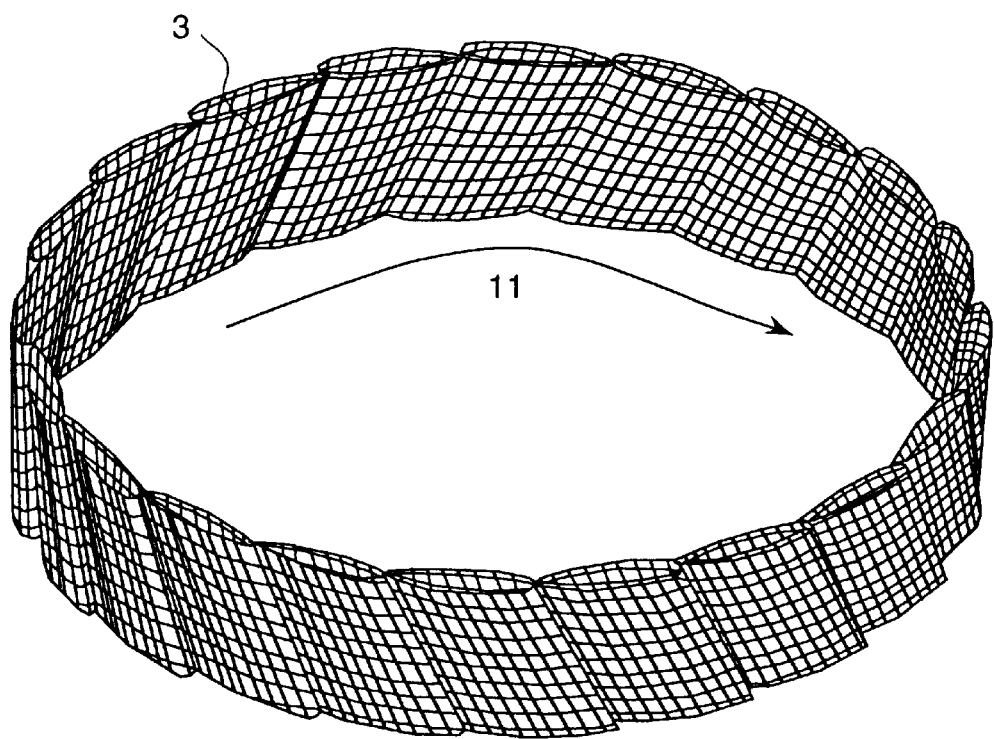
FIG. 17 is a perspective view of the guide vanes of the fifth embodiment under the condition that the guide vanes are closed.

Next, referring to FIG. 16 and FIG. 17, a water turbine of a fifth embodiment of the present invention will be described hereunder. FIG. 16 is a view of one vane of guide vanes, viewed from the upper cover side under the condition that the guide vanes are closed. FIG. 17 is a perspective view of guide vanes being closed. The other construction than the guide vanes is the same as the first embodiment, so that its explanation is omitted here.

In the present embodiment, a displacement direction of sections of each vane of the guide vanes 3 is opposite to the direction in the first embodiment. That is, sections of each vane perpendicular to the rotating shaft 7 are continuously displaced at a fixed rate in a direction reverse to the rotation direction 11 of the runner 4 from the side of upper cover 5 (upper side) to the side of the lower cover 6 (lower side). In this case, profiles of the vane sections do not change but the positions thereof change. In other words, the profiles of respective sections of each vane which are displaced in an opposite direction to the rotation direction 11 are similar to each other and the similarity is 1.

The vane of the present embodiment has the following two appearance features. The first feature is that a profile of vane viewed from a radial direction of the runner 4 is generally parallelogram. The second feature is that when the vane is viewed from the upper side of the rotating shaft 7, the sections perpendicular to the rotating shaft 7 appear to deviate to a direction opposite to the rotation direction 11 of the runner 4. In this manner, the three-dimensional vane type guide vanes 3 is constructed.

By being provided with such features, when the guide vanes 3 are closed, a leading edge 15 and a trailing edge 16 of adjacent vanes are in contact with each other. Therefore, sufficient shutdown performance can be maintained as shown in FIG. 17. In this manner, in the present embodiment, three-dimensional vane type guide vanes which are able to shutdown can be constructed.

In the case of the present embodiment, under the condition that the guide vanes are opened, distance between the guide vanes 3 and the inlet of the runner 4 is farther (larger) at the lower side than at the upper side. Therefore, as mentioned above, the influence of eddy layer which the runner 4 has, reaches to an upstream side. As a result, an inflow angle of the leading edge of each vane on the side of the band 8 of the runner 4 is an angle at which water flows in at a side closer to the pressure surface side than in a conventional machine. Thereby, the pressure on the pressure surface side rises, so that it is effective for prevention of cavitation which is likely to occur on the side of the band 8 of the inlet of the runner at time of low head. The effect is confirmed also by the inventor's analysis.

As mentioned above, according to the present embodiment, cavitation occurring on the pressure surface side of the runner 4 at time of low head can be effectively prevented, and a water turbine provided with three-dimensional vane type guide vanes 3 which are able to be shutdown can be obtained.

EMBODIMENT 6

Figure 18:
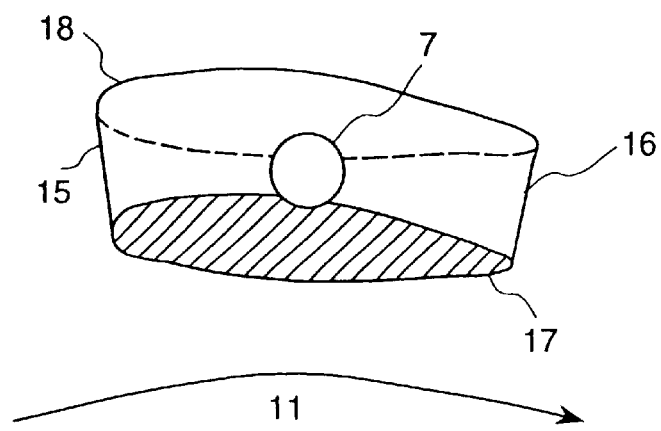
FIG. 18 is a perspective view of a vane of guide vanes, viewed from an upper cover under the condition that the guide vanes of a sixth embodiment are closed.
Figure 19:
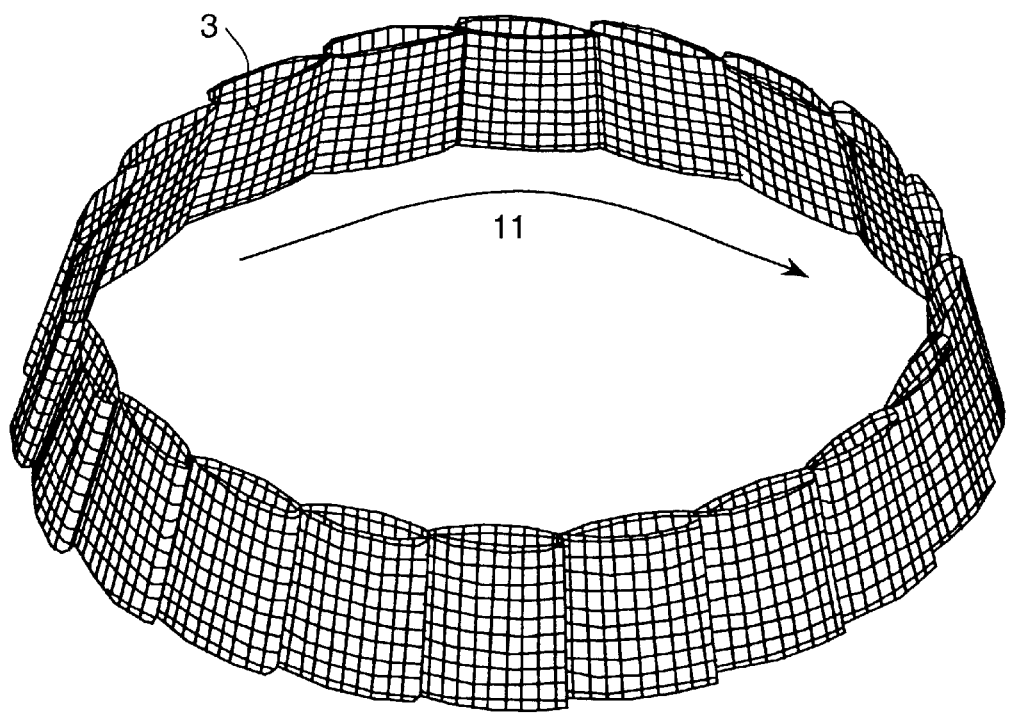
FIG. 19 is a perspective view of the guide vanes of the sixth embodiment under the condition that the guide vanes are closed.
Figure 21:
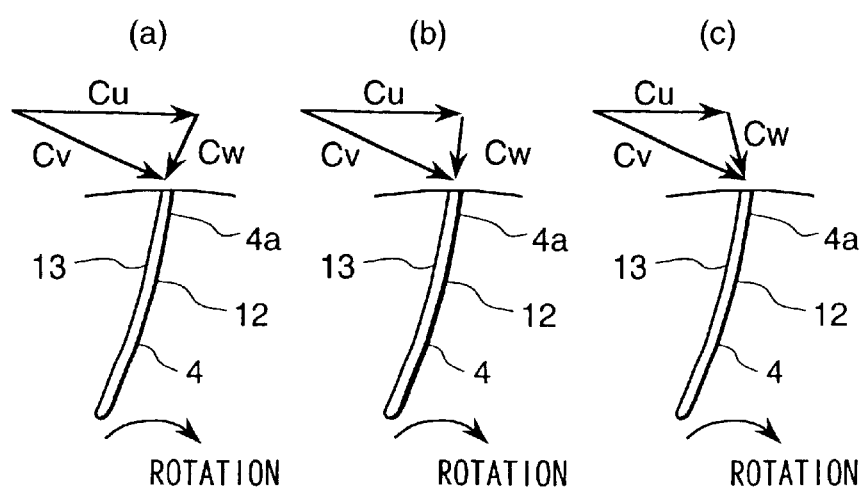
FIG. 21 is schematic views showing speed triangles, (a) is at time of low head, (b) is at time of rated operation head and (c) is at time of high head.
Figure 20A:
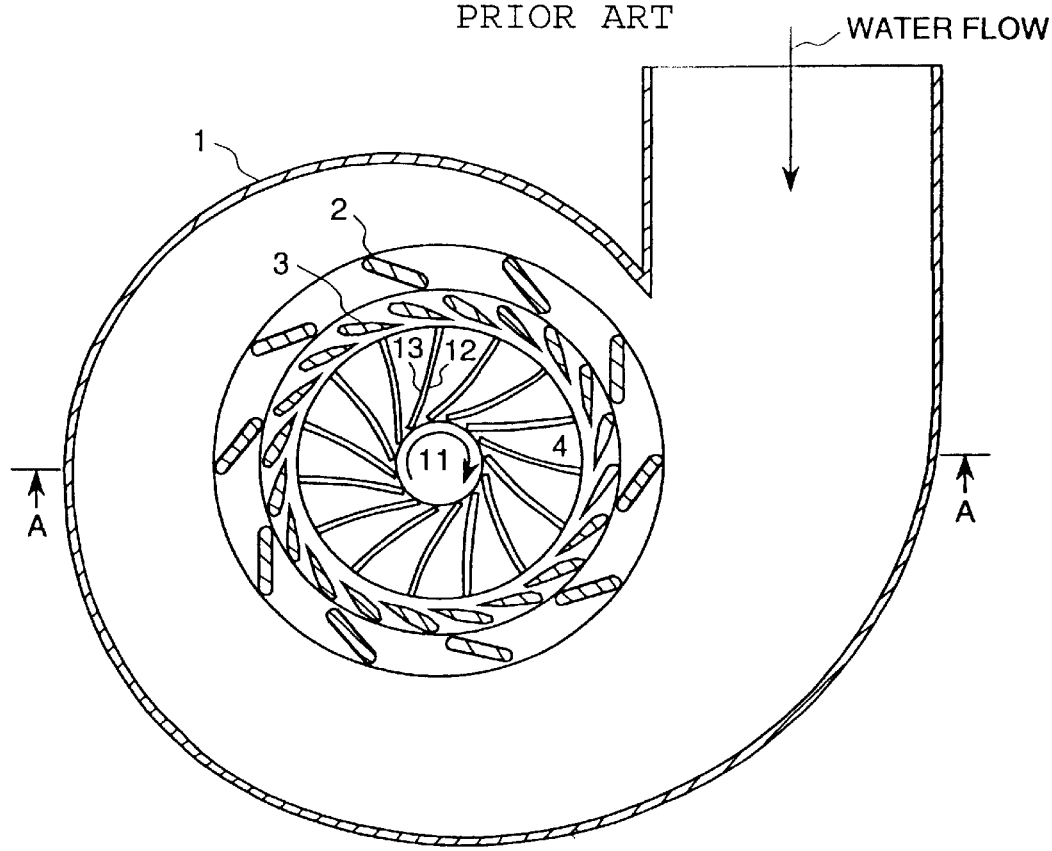
FIGS. 20(a) and 20(b) each are a conventional turbine.
Figure 20B:
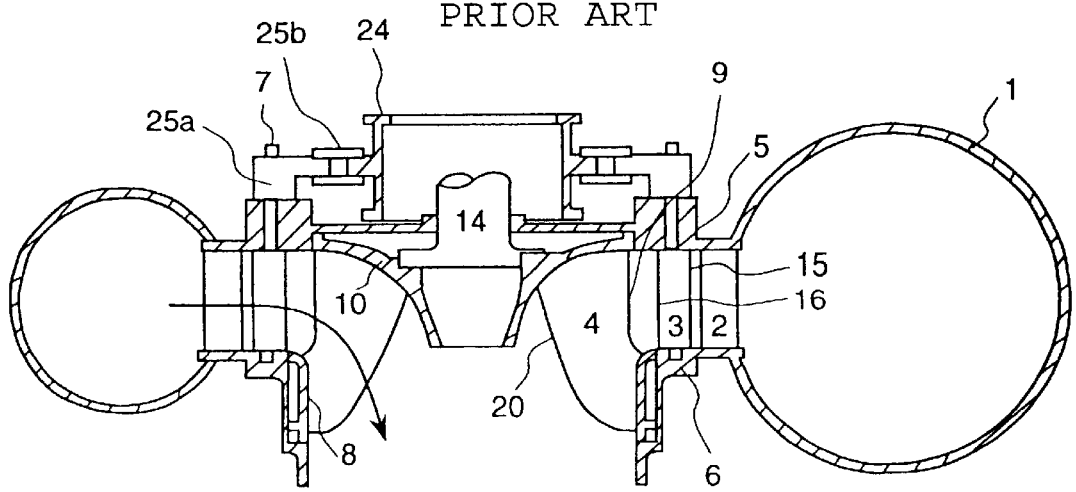
Figure 22:
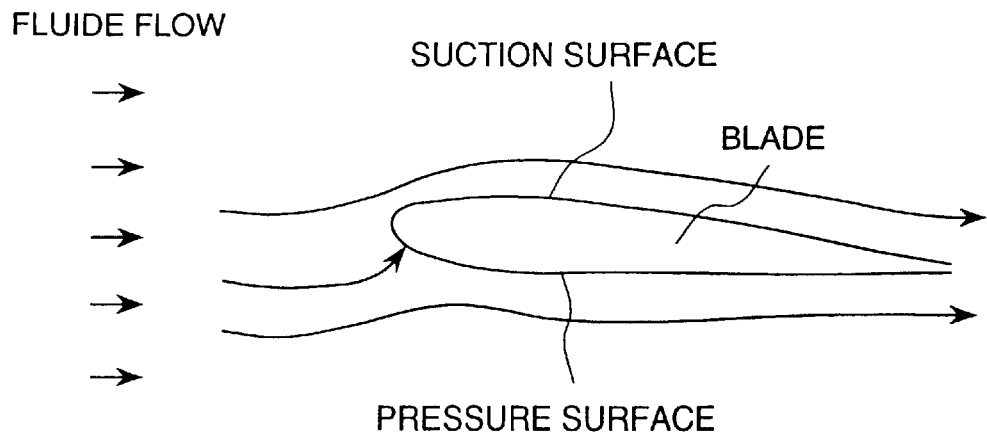
FIG. 22 is a view for explaining flow of fluid at the tip of a blade.
Figure 23:
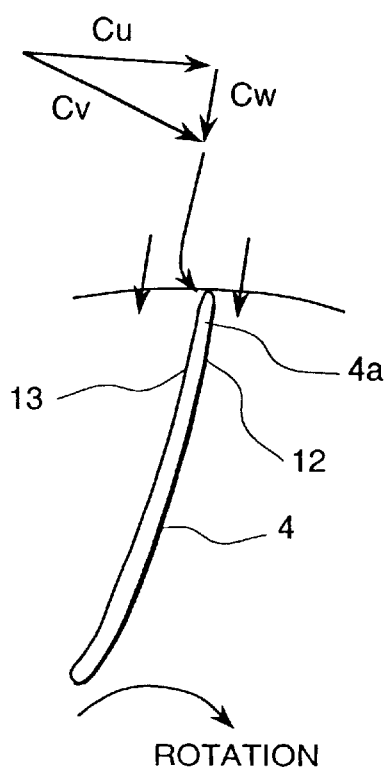
FIG. 23 is a view for explaining a water flow at the tip of a runner blade.

Next, referring to FIGS. 18 and 19, a water turbine of a sixth embodiment of the present invention will be described hereunder. FIG. 18 is a view of one vane of guide vanes, viewed from the upper cover side under the condition that the guide vanes of the sixth embodiment are closed. FIG. 19 is a perspective view of guide vanes 3 being closed. The other construction than the guide vanes is the same as the first embodiment, so that its explanation is omitted here.

In the present embodiment, a displacement direction of sections of each vane of the guide vanes 3 is opposite to the direction in the second embodiment. That is, sections of each vane perpendicular to the rotating shaft 7 are continuously displaced at a fixed rate to a radially inner side of the runner 4 from the side of upper cover 5 (upper side) to the side of the lower cover 6 (lower side). In this case, profiles of the vane sections become larger from the upper side to the lower side, and are similar to each other. That is, The chord length and the peripheral length of vane section is proportional to a distance from the center of the runner of the runner 4. The section area of the vane is proportional to the second power of distance from the center of the runner 4.

The vane of the present embodiment has the following two appearance features. The first feature is that a profile of vane viewed from a radial direction of the runner 4 is generally trapezoidal. The second feature is that when the vane is viewed from the upper side of the rotating shaft 7, the sections perpendicular to the rotating shaft 7 appear to deviate to a radially outer side of the runner 4. In this manner, the three-dimensional vane type guide vanes 3 is constructed.

As shown in FIG. 18, a sectional shape 18 on the lower side of vane of the runner 3 expands similarly the sectional shape on the upper side and is moved toward the outer side of the runner 4, but it is not simply moved in parallel. In this case, a projection line, which is formed by projecting, on a plane perpendicular to the central axis of the runner 4, a line connecting the corresponding points in respective sections of the vane from the upper side to the lower side, is a part of a straight line extending radially from the central axis. For example, the projection line of the line connecting points of the leading edge 15 (or trailing edge 16) of a vane in respective sections from the upper side to the lower side is a part of a straight line extending radially to the central axis.

By being provided with such features, the leading edge 15 and the trailing edge 16 of adjacent vanes become in a condition that they are in contact with each other when the guide vanes 3 are closed. Therefore, as shown in FIG. 19, sufficient shutdown performance can be maintained. In this manner, in the present embodiment, three-dimensional vane type guide vanes which are able to be shutdown can be constructed.

In the present embodiment, also, under the condition that the guide vanes 3 are opened at time of operation of the water turbine, the distance between the guide vanes 3 and the inlet of the runner 4 is farther (larger) on the lower side than on the upper side. Therefore, cavitation which is likely to occur on the band side of the inlet of the runner at time of low head can be effectively prevented as in the fifth embodiment.

As mentioned above, according to the present embodiment, cavitation occurring on the pressure surface side of the runner 4 at time of low head can be effectively prevented, and a water turbine provided with three-dimensional vane type guide vanes which are able to shutdown can be obtained.

Further, to the fifth and sixth embodiments, the concept of the third or fourth embodiment can be applied. That is, in the fifth and sixth embodiments, a displacement rate of sections of vane of the guide vanes 3 can be made larger from the upper side to the lower side. Further, the features of the fifth embodiment and the sixth embodiment can be combined.

Further, in the fourth embodiment, sections of vane of the guide vanes 3 are changed in the two directions, the peripheral direction and the radial direction. In this case, the displacement directions are combined so that cavitation preventing effects are strengthened with each other. However, combination of the displacement directions is not limited to the combination whereby the effects are strengthened with each other. That is, even if a combination by which the effects are weakened with each other can be taken as long as a desired cavitation preventing effect can be achieved as a result.

According to the present invention, a water turbine can be realized which is provided with guide vanes which are easy to design and have a shape of three-dimensional vane type and in which occurrence of cavitation can be prevented at a low cost.

What is claimed is:

1. A water turbine comprising:
    a runner;
    guide vanes formed of a plurality of vanes arranged outside said runner in a peripheral direction, each of said vanes being rotatable about a center axis thereof parallel with a rotation shaft of said runner;
    stay vanes formed of a plurality of vanes outside said guide vanes in a peripheral direction; and
    a casing covering the outside of said stay vanes, characterized in that
        sections of each vane of said guide vanes perpendicular to said center axis are along a peripheral direction of said runner from one side to the other side in said center axis, under the condition that said guide vanes are shutdown; and
        respective profiles of said sections displaced are the same as each other and the size of each said section is set according to a distance from said rotating shaft of said runner.

2. A water turbine according to claim 1, wherein all the vanes forming said guide vanes are the same in shape.

3. A water turbine according to claim 1, wherein the sections of each of said guide vanes have the same size as each other.

4. A water turbine comprising
    a runner;
    guide vanes formed of a plurality of vanes arranged outside said runner in a peripheral direction, each of said vanes being rotatable about a center axis thereof parallel with a rotation shaft of said runner;
    stay vanes formed of a plurality of vanes outside said guide vanes in a peripheral direction; and
    a casing covering the outside of said stay vanes, characterized in that
        sections of each vane of said guide vanes perpendicular to said center axis are displaced along a peripheral direction of said runner from one side to the other side in said center axis, under the condition that said guide vanes are shutdown.

5. A water turbine according to claim 4, wherein said sections of each vane of said guide vanes each are displaced to a rotation direction of said runner from an upper cover side of said guide vanes to a lower cover side.

6. A water turbine according to claim 4, wherein said sections of each vane of said guide vanes each are displaced to a direction opposite to the rotation direction of said runner from an upper cover side of said guide vanes to a lower cover side.

7. A water turbine according to claim 4, wherein a displacement rate of said sections displaced to the peripheral direction of said runner becomes larger from an upper cover side of said guide vanes to a lower cover side.

8. A water turbine according to claim 4, wherein the sections of each of said guide vanes have the same shape and same size as each other.

9. A water turbine comprising:
    a runner;
    guide vanes formed of a plurality of vanes arranged outside said runner in a peripheral direction, each of said vanes being rotatable about a center axis thereof parallel with a rotation shaft of said runner;
    stay vanes formed of a plurality of vanes outside said guide vanes in a peripheral direction; and
    a casing covering the outside of said stay vanes, characterized in that
        sections of each vane of said guide vanes perpendicular to said center axis are displaced to a radial direction of said runner from one side to the other side in said center axis, under the condition that said guide vanes are shutdown; and
        respective profiles of said sections displaced are similar to each other and said sections are formed so as to be smaller in size as distance from said rotating shaft of said runner becomes smaller.

10. A water turbine according to claim 9, wherein said guide vanes are formed so that chord length of each said section of each vane of said guide vanes changes in proportion to the distance from said rotating shaft of said runner.

11. A water turbine according to claim 9, wherein said sections of each vane of said guide vanes each are displaced to a radially inner side of said runner from an upper cover side of said guide vanes to a lower cover side.

12. A water turbine according to claim 9, wherein said sections of each vane of said guide vanes each are displaced to a direction opposite to the rotation direction of said runner from an upper cover side of said guide vanes to a lower cover side.

13. A water turbine according to claim 9, wherein a displacement rate of said sections displaced to the peripheral direction of said runner becomes larger from an upper cover side of said guide vanes to a lower cover side.

14. A water turbine comprising:
   a runner;
   guide vanes formed of a plurality of vanes arranged outside said runner in a peripheral direction, each of said vanes being rotatable about a center axis thereof parallel with a rotation shaft of said runner;
   stay vanes formed of a plurality of vanes outside said guide vanes in a peripheral direction; and
   a casing covering the outside of said stay vanes, characterized in that
      sections of each vane of said guide vanes perpendicular to said center axis are displaced to both a peripheral direction and a radial direction of said runner from one side to the other side in said center axis, under the condition that said guide vanes are shutdown; and
      respective profiles of said sections displaced are similar to each other and said sections are formed so as to be smaller in size as distance from said rotating shaft of said runner becomes smaller.

15. A water turbine comprising:
   a runner;
   three-dimensional vane type guide vanes arranged outside said runner;
   stay vanes arranged outside said runner; and
   a casing covering the outside of said stay vanes, characterized in that each vane forming said guide vanes is formed so that
      a profile of each said guide vane, viewed from a radial direction of said runner is generally in the form of a parallelogram under the condition that said guide vanes are closed, and
      when each said guide vane is viewed from a center axis of rotation thereof, sections thereof perpendicular to said center axis appear deviated to a peripheral direction of said runner.

16. A water turbine comprising:
   a runner;
   three-dimensional vane type guide vanes arranged outside said runner;
   stay vanes arranged outside said runner; and
   a casing covering the outside of said stay vanes, characterized in that each vane forming said guide vanes is formed so that
      a profile of each said guide vane, viewed from a radial direction of said runner is generally trapezoidal under the condition that said guide vanes are closed, and
      when each said guide vane is viewed from the center axis of rotation thereof, sections thereof perpendicular to said center axis appear deviated to a radial direction of said runner.

* * * * *